US012627702B2

(12) United States Patent
Jones et al.

(10) Patent No.: US 12,627,702 B2
(45) Date of Patent: May 12, 2026

(54) CYBER AND PROPERTY MANAGEMENT SYSTEM

(71) Applicant: Raytheon Company, Arlington, VA (US)

(72) Inventors: Frederick K. Jones, Tucson, AZ (US); Jeffrey Zhonghua Han, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 0 days.

(21) Appl. No.: 18/627,945

(22) Filed: Apr. 5, 2024

(65) Prior Publication Data

US 2025/0317463 A1     Oct. 9, 2025

(51) Int. Cl.
*H04L 9/40* (2022.01)

(52) U.S. Cl.
CPC ................................ *H04L 63/1433* (2013.01)

(58) Field of Classification Search
CPC .................................................. H04L 63/1433
See application file for complete search history.

(56) References Cited

U.S. PATENT DOCUMENTS

| | | | |
|---|---|---|---|
| 8,019,865 B2 | 9/2011 | Chang et al. | |
| 8,917,159 B2 | 12/2014 | Mcallister et al. | |
| 2009/0243856 A1 | 10/2009 | Lee et al. | |
| 2010/0100965 A1* | 4/2010 | O'Brien | G06Q 10/10 |
| | | | 726/25 |
| 2013/0293352 A1* | 11/2013 | Vargas | G06K 19/0723 |
| | | | 340/10.1 |
| 2014/0188549 A1 | 7/2014 | Saccone | |
| 2016/0048667 A1 | 2/2016 | Kao | |
| 2018/0248897 A1 | 8/2018 | Hussey et al. | |
| 2019/0043059 A1 | 2/2019 | Xie et al. | |
| 2019/0068650 A1 | 2/2019 | Castel | |
| 2020/0007551 A1 | 1/2020 | Valente et al. | |
| 2021/0314338 A1* | 10/2021 | Howe | H04L 63/1408 |
| 2021/0334085 A1 | 10/2021 | Vessels et al. | |

(Continued)

FOREIGN PATENT DOCUMENTS

| | | |
|---|---|---|
| WO | 2025213028 | 10/2025 |

OTHER PUBLICATIONS

"International Application Serial No. PCT US2025 023165, International Search Report mailed Jul. 22, 2025", 4 pgs.

(Continued)

*Primary Examiner* — Joe Chacko
(74) *Attorney, Agent, or Firm* — Schwegman Lundberg & Woessner, P.A.

(57) ABSTRACT

A system and method are provided for integrating a property management system and a cyber vulnerability management system to provide remediation for assets in an environment. Information obtained about network connected mechanical assets within the environment is respectively obtained from a tag on the asset. For each asset the asset is identified through a property management database based on the information in the tag and a cyber position of the asset is obtained through a digital network identifier in the tag from the cyber vulnerability management system. In response to identification of the asset having a cyber vulnerability, remediation for the cyber vulnerability is determined, scheduled, and initiated.

16 Claims, 4 Drawing Sheets

(56)        References Cited

U.S. PATENT DOCUMENTS

| 2021/0400074 | A1 | 12/2021 | Smith et al. |
| 2022/0183915 | A1 | 6/2022 | Augustine et al. |
| 2023/0375476 | A1 | 11/2023 | Vasefi et al. |
| 2023/0412631 | A1 | 12/2023 | Revankar et al. |

OTHER PUBLICATIONS

"International Application Serial No. PCT US2025 023165, Written Opinion mailed Jul. 22, 2025", 7 pgs.
Henriques, Leonardo, "SecureIIoT A Cybersecurity Approach for Industrial Internet of Things Environments", 2023 International Conference On Advanced Enterprise Information System AEIS, IEEE,, Dec. 1, 2023, 7 pgs.

* cited by examiner

400

402

CYBER AND PROPERTY MANAGEMENT SYSTEM

FIELD

The subject matter disclosed herein relates to a combined cyber vulnerability and property management system.

BACKGROUND

Property management, notably in industrial settings, is disconnected from IT configuration management and cyber status monitoring systems as disparate information is used to index these systems. Computer-controlled assets in such a setting may be managed remotely, such as being periodically upgraded for cyber vulnerabilities. However, remote interactions with industrial assets are rife with difficulties, including human-related and processing-related timing issues.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
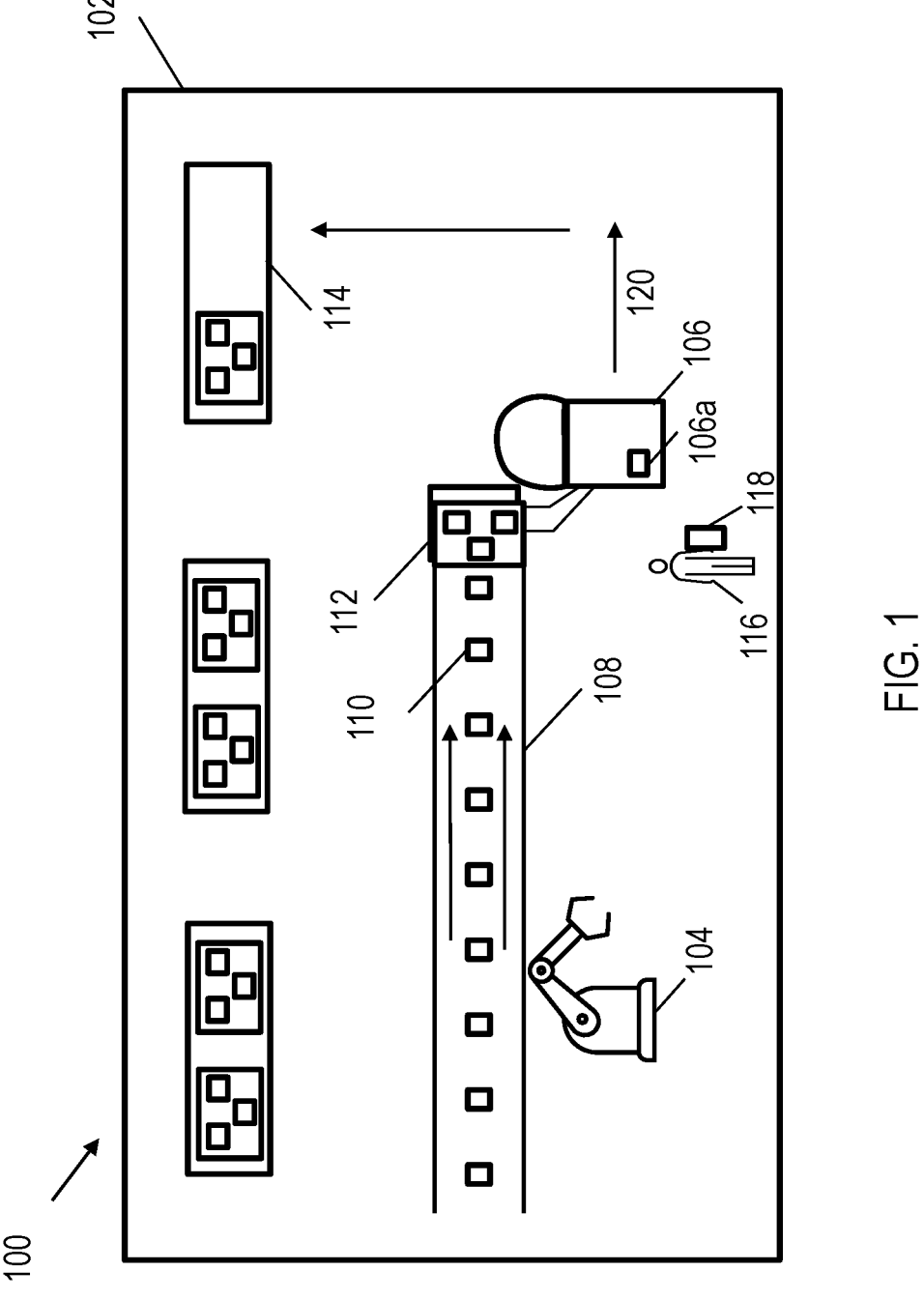
FIG. 1 illustrates an industrial environment according to some aspects.

FIG. 1 illustrates an environment that contains multiple assets according to some aspects. The environment 100 may be an industrial environment, such as a factory or other commercial environment. Although an industrial environment is described herein for managing cyber risks within the industrial environment to robotics, industrial internet of things (IIOT) devices, manufacturing test stations, etc., the technology may also be applicable to other settings such as critical infrastructure (water, electric, agriculture, dams, etc.), hospitals, warehouses, RADAR installations, or anywhere implementing property management with networked components.

The environment 100 may include an area 102 in which multiple mechanical assets 104, 106 are located. The assets 104, 106 may include industrial equipment such as robots and/or measurement equipment. For example, one of the assets 104 may be used for (visual) inspection of items 110 traveling along a conveyer 108; another of the assets 106 may move bins 112 containing a predetermined number/weight of the items 110 to storage facilities 114 (e.g., racks) within the environment 100. The assets 106 may move along predetermined tracks 120 or movement may be autonomous, using sensors to reach a desired storage facility 114 in which the bin 112 conveyed by the asset 106 is to be retained until further processing of the items 110 is desired.

The assets 104, 106 may include one or more processors and network interfaces that connect the asset 104, 106 to an intranet operational essentially within the environment 100 (e.g., using Zigbee, Bluetooth, and/or another direct or indirect communication protocol) and/or to an internet. The intranet may be used, e.g., for the asset 104, 106 to communicate with other devices within the environment 100, which may include one or more of the other assets 104, 106 and/or to a central controller (e.g., control computer) within the environment 100.

Each of the assets 104, 106 may have a physical tag 106a containing information about the asset 104, 106. An operator 116 may use a scanner 118, such as an optical scanner or contact scanner to obtain the information of the physical tag 106a. In some embodiments, information of the physical tag 106a may be obtained via contactless interaction and/or via physical contact. Contactless interaction may include using radio frequency (RF) or optical scanning—e.g., using a radio frequency ID (RFID), quick response (QR) code, or barcode. The physical tag 106a may also include an electrically readable portion that is electrically readable (i.e., readable using electrical contact with the electrically readable portion).

In some embodiments, the physical tag 106a may include an adhesive (e.g., paper) tag with contactless portion (e.g., a QR Code) and an electrically readable portion. The electrically readable portion may include a pattern printed using electrically reactive ink (e.g., resistive, conductive, dielectric). The physical tag 106a may be manually read using a QR Code and/or another scanner (e.g., a contact scanner).

The information may be separated into different areas of the physical tag 106a, with the QR Code (e.g., top) in one location and the pattern in another location (planar). Alternatively, the information may be layered on the physical tag 106a, with each piece of information available without interfering with the other (e.g., the QR code on the top surface (perhaps protected by a protective layer) and the pattern disposed on a lower layer that is able to be physically contacted at a location other than the QR code).

Both the QR Code and the pattern may encode the same unique identifier (tag value). In some embodiments, multiple patterns may be used to provide additional information that does not include the identifier. The pattern may be formed such that when a voltage is applied across the pattern, the identifier is able to be determined by the change in voltage over the pattern. Computing systems may then be able to read the identifier over the network without being dependent on a dedicated camera.

The physical tag 106a thus may be read using different modes, which include a camera or via changes in electrical signals. The modes accommodate both the property asset owner (camera) and cyber defense team (electrical/network). With technology, the physical asset management and cyber asset management databases can maintain alignment without human intervention. The pattern may be used in environments that do not allow for RF communications. Such environments include classified/sensitive environments that contain classified information and classified information systems.

The pattern may include circuitry; thus, an operator 116 may use the contact scanner to contact circuitry on the physical tag 106a. For example, one or more R2R ladders or other circuits may be printed on the physical tag 106a as the pattern using resistive ink. The circuit on the physical tag 106a may provide one or more unique identifiers that provide information about the asset 104, 106 (e.g., identifier, model, serial number, software version). The resistive ink may be altered during remediation, as described in more detail below.

Similar tags may be provided on the packaging of items 110. Such tags may provide information about the unit in the packaging. The packaging may also contain an anti-tamper feature (such as shrink wrap) to ensure legitimate and unmodified packaging.

As indicated above, real-time asset tracking (e.g., with RFID) of industrial assets may use associated dashboards and maps to assist decision makers for planning operations within the environment, such as movement operational speeds associated with the assets. The real-time asset tracking may obtain information from a property management database. For cyber vulnerability management, real-time cyber vulnerability alerts and patch management among others with associated dashboards may be used based on information in a cyber vulnerability management system that stores the cyber position of each asset.

In more detail, ISO 27005 (Information Security, cybersecurity, and privacy protection-Guidance on managing information security risks) defines vulnerability as: "A weakness of an asset or group of assets that can be exploited by one or more threats, where an asset is anything that has value to the organization, its business operations, and their continuity, including information resources that support the organization's mission; and a threat is an entity of natural or human origins, either accidental or deliberate, that has the potential to harm assets such as information, processes, systems, and therefore, organizations."

A cyber vulnerability is a flaw in a system that can weaken the overall security of the device/system. Cyber vulnerabilities may include, but are not limited to, weaknesses in the hardware itself, or the software that runs on the hardware. Cyber vulnerabilities can be exploited by a threat actor, such as a malicious attacker, to cross privilege boundaries (perform unauthorized actions) within a system. Cyber vulnerabilities may include reported vulnerabilities of software installed on the asset and asset configurations connected to cyber attack tactics, techniques, and procedures.

The basic principles of information security are centered around the CIA (Confidentiality, Integrity, and Availability) Triad: Confidentiality: Protects sensitive data by keeping it private and safe from unauthorized access or disclosure. This includes protecting information from bad actors with malicious intent, as well as limiting access to only authorized individuals. Integrity: Protects data from unnecessary or unintended changes, whether malicious or accidental. Availability: Allows for access to data to those who need it, without affecting its confidentiality or integrity.

The cyber position (health) of an asset may include software and versions, user accounts and permissions, software configurations, local security application settings, and local security-relevant event logs. The cyber position of a system includes protecting the system by keeping data private from those who do not need access to it (confidentiality), preserving the data from unintended or unnecessary changes (integrity), and ensuring that those who need access to it are not prevented from accessing it (availability).

A cyber vulnerability management system may accomplish this with: Common Vulnerability and Exposures (CVE) tracking, where CVEs are specific instances of type of weakness or vulnerabilities that can exist on a system. CVEs may be present on a specific set of software versions;

a software patch may be used to remove the vulnerability from a system. One such example of a CVE is CVE-2014-0160, or OpenSSL 'Heartbleed', where a vulnerability in OpenSSL could allow a remote attacked to expose sensitive data, possible including user authentication credentials and secret keys, through incorrect memory handling in the TLS heartbeat extension. This vulnerability was mitigated using patching from OpenSSL versions 1.0.1 through 1.0. Unusual network activity includes, but is not limited to, suspicious log-ins/access from unidentified IP-Addresses, and network traffic to external or unidentified IP addresses. "Software Bill of Materials" is an account and inventory of all software and corresponding versions on the system. The cyber vulnerability management system may identify software versions with known CVEs or excess software not intended nor mandatory for the proper function of the system.

However, such systems traditionally operate in isolation, using asset management identifiers that are obtained through entirely different mechanisms that are not coordinated or synchronized. The cyber vulnerability management system herein is able to identify vulnerabilities present on a system or network. In response to the identification, the cyber vulnerability management system may assign a cyber risk score to the system, network, and/or asset. In addition, the cyber vulnerability management system may create and/or execute a remediation plan based on the identification and risk. The remediation plan (also referred to herein as remediation or cyber remediation) may include scheduling and prioritization of work to mitigate some, or all, of the vulnerabilities identified. For example, the remediation plan for an asset may include providing patches to the asset for updating software in the asset, recalibration of the asset as well as updating information locally within the asset environment (e.g., adjusting the asset tag physically and/or electronically).

In particular, patch management may include providing a software update. The software update may include changing software for one or more assets in addition to applying software updates to the overall system. Small changes to the software are referred to as software patches. However, even introducing small changes to the software introduces risks to the overall operation of the system, notably in conjunction with operations within an industrial environment in which operations may occur essentially constantly. Such patch management may thus involve the identification, acquisition, and deployment of software changes to affected assets and systems.

The assets in the industrial environment may also include metrology processes, where metrology is the science of measurement. Metrology is used in manufacturing quality assurance and efficient operations and involves calibration of the equipment performing the measurements.

Figure 2:
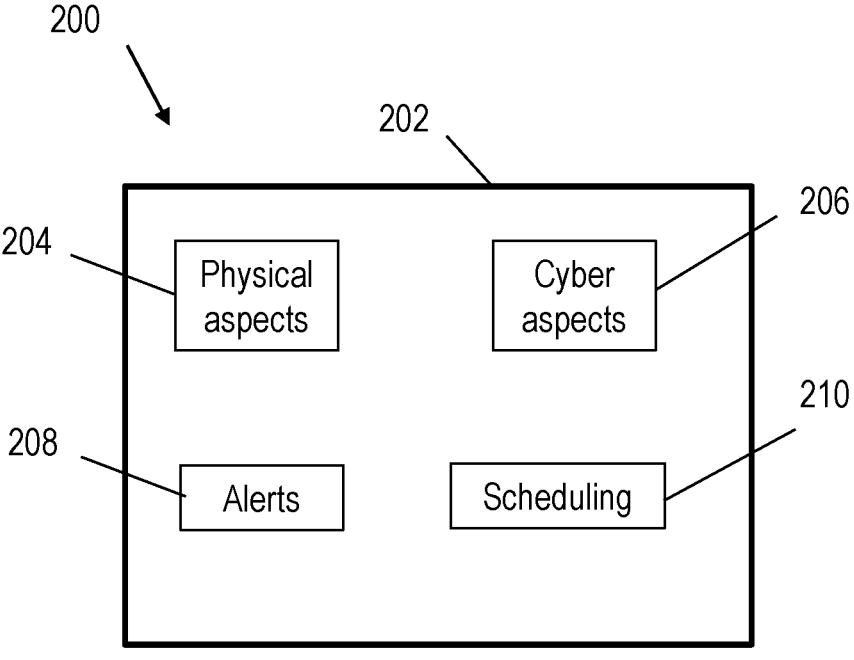
FIG. 2 illustrates a system according to some aspects.

FIG. 2 illustrates a system according to some aspects. The system 200 includes a display 202 that provides outputs related to integration of patch management into metrology calibration workflows. Although some of the outputs are shown, others may be present. The display 202 may provide information about each of the assets and/or the overall system in the industrial environment, and/or one or more individual assets. For example, for a particular asset, the outputs may include physical aspects 204 of the asset, cyber aspects 206 of the asset, alerts 208 pertaining to the asset, and scheduling 210 related to patching of the asset. The physical aspects 204 of the asset may include a least a portion of the information obtained via the tag such as identifier, model, serial number, location (e.g., within the industrial environment), tasks performed by the asset, etc.

The cyber aspects 206 of the asset may include a network identifier (e.g., IP address or MAC address), software version and patches, network connectivity, etc., some or all of which may or may not be provided on the tag. The alerts 208 of the asset may include whether patches should be applied, whether such patches are optional or mandatory, whether the asset actions indicate extraneous or unexpected physical or network actions or whether inefficiencies exist in network transmissions, etc. The scheduling 210 may include asset operations and timing (e.g., time periods when the asset is being used/idle) as well as operations within the industrial environment that affect use of the asset, including time for recalibration of the asset (if recalibration is to be performed).

Integration of the property management system (or physical logistics system) with the cyber system avoids issues related to the isolation between the disparate systems. For example, cyber teams (e.g., automated systems that are involved in updating software in the environment) may or may not be under control of the asset owners/operators. Such cyber teams may now be able to know the asset location, type of asset, and/or ownership associated with the IP address of the asset that is to be updated, thereby permitting better synergy between the cyber teams and property management team. The property management team may themselves not otherwise know cyber issues such as the cyber and network performance information of the asset, cyber risk, and availability of a mandatory update, and may lack clear work instructions and coordination between project management and cyber remediation activities to allow coordination between project management and cyber remediation management activities.

The interaction between the systems permits the cyber team to discover asset property management records to respond quickly to cyber events such as intrusions and malware installation on assets. Remediation is a planned effort that is aligned with metrology calibration processes; remediation activities may be shifted to asset owner workflows, freeing up the cyber team. Entities (e.g., electronic devices) visiting the environment that have access to the integrated system may be able to determine the security posture of supporting systems. As cyber risks during manufacturing incur significant financial risks due to new hazards to assets (e.g., compromised robotics) and warranty-related recalls (e.g., compromised products), enabling factory operators to integrate cyber remediation into larger risk management system (logistics, production quotas, quality escapes, staffing, etc.) enables enhanced productivity by the assets with updated scheduling and routing, for example, while reducing disruptions in the manufacturing processes. For example, remediation may adjust programming to mandate an extra layer of security prior to changes in physical routes taken within the environment or additional network interactions taken by an asset, e.g., by mandating local interaction with the asset through a user interface on the asset or adjustment of the information provided on the tag.

In some embodiments, the system 200 may provide a cyber status report via a uniform resource locator (URL). The cyber status report URL may be associated with the asset identifier on the tag, such as the RFID or QR Code as above. In other embodiments, the tag identifier may be virtual; that is tag identifier may instead be a fixed point on a map. In this case, a physical tag may be used to supplement the virtual tag or use of the physical tag may be avoided. Use of the display 202 provides further functionalities to be used between the systems, such as using color-coded symbols to convey information such as different cyber risk statuses and beneficial scheduling alignment, in addition to displaying an overall cyber and network health status report that is related to the network rather than the assets within the network. The cyber and network health status report may include, among others, the current system configuration (e.g., operating system, apps installed, user accounts, etc.), insider threat alerts (e.g., suspicious/unusual system or network behavior observed within the environment), network diagnostics to support network performance improvements within the environment, and remediation workflow to provide a coordination checklist between asset owners and the cyber team.

Figure 3:
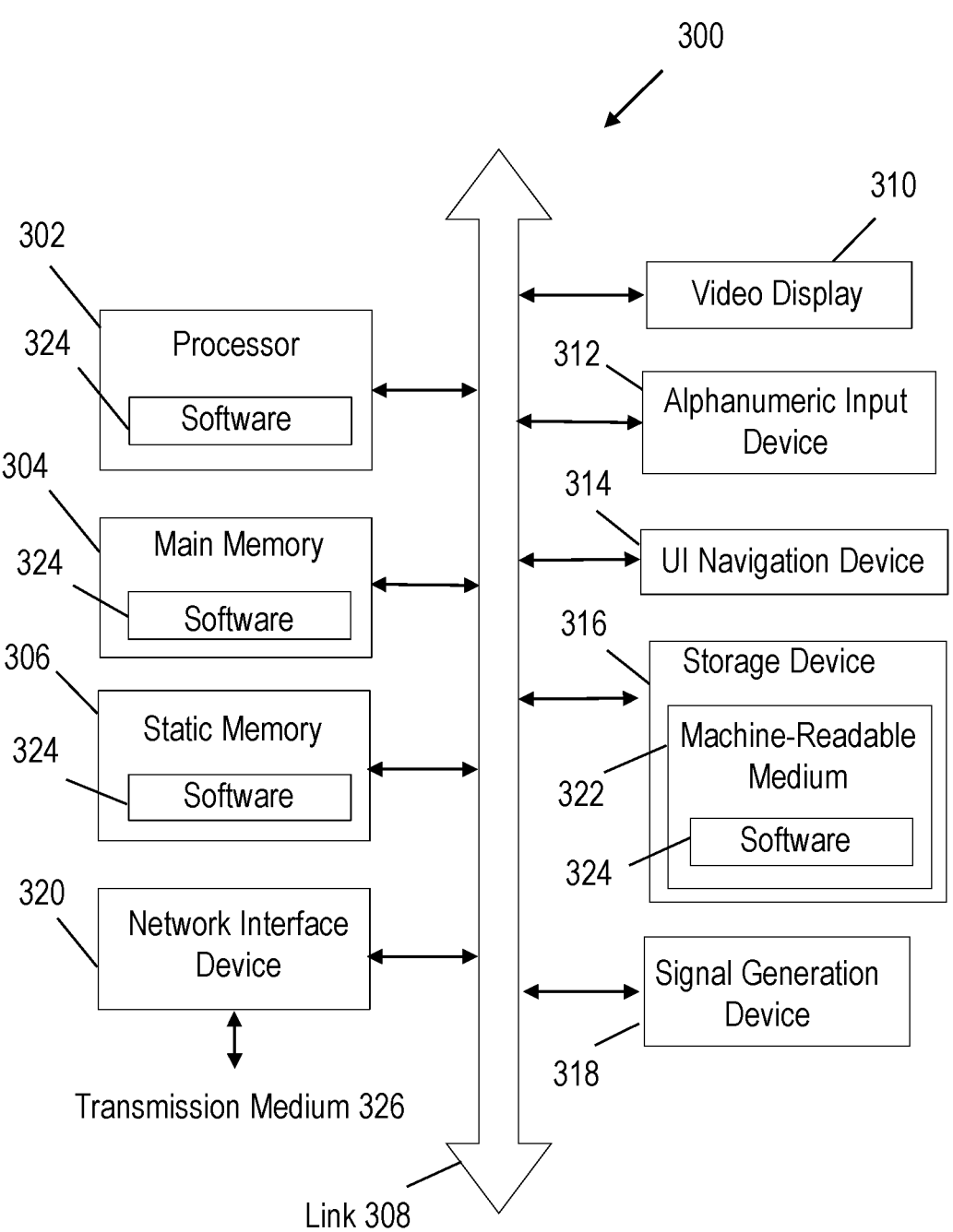
FIG. 3 illustrates a block diagram of a device according to some aspects.

FIG. 3 illustrates a block diagram of an asset in accordance with some embodiments. The asset 300 may be any electronic device described herein. Examples of devices include a robot, measurement equipment, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The asset 300 may include some or all of the elements shown in FIG. 3, including a hardware processor (or equivalently processing circuitry) 302 (e.g., a central processing unit (CPU), a GPU, a hardware processor core, or any combination thereof), a main memory 304 and a static memory 306, some or all of which may communicate with each other via an interlink (e.g., bus) 308. The main memory 304 may contain any or all of removable storage and non-removable storage, volatile memory or non-volatile memory. The asset 300 may further include a display unit 310 such as a video display, an alphanumeric input device 312 (e.g., a keyboard), and a user interface (UI) navigation device 314 (e.g., a mouse) or tag. In an example, the display unit 310, input device 312 and UI navigation device 314 may be a touch screen display. The asset 300 may additionally include a storage device (e.g., drive unit) 316, a signal generation device 318 (e.g., a speaker), a network interface device 320, and one or more sensors, such as a global positioning system (GPS) sensor, compass, accelerometer, or another sensor. The asset 300 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 316 may include a non-transitory machine readable medium 322 (hereinafter simply referred to as machine readable medium) on which is stored one or more sets of data structures or instructions 324 (e.g., software) embodying or utilized by any one or more of the techniques or functions described herein. The non-transitory machine readable medium 322 is a tangible medium. The instructions 324 may also reside, completely or at least partially, within the main memory 304, within static memory 306, and/or within the hardware processor 302 during execution thereof by the asset 300. While the machine readable medium 322 is illustrated as a single medium, the term "machine readable medium" may include a single medium or multiple media (e.g., a centralized or distributed database, and/or associated caches and servers) configured to store the one or more instructions 324.

The term "machine readable medium" may include any medium that is capable of storing, encoding, or carrying instructions for execution by the asset 300 and that cause the asset 300 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 324 may further be transmitted or received over a communications network using a transmission medium 326 via the network interface device 320 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as IEEE 802.11 family of standards known as Wi-Fi, IEEE 802.16 family of standards known as WiMax, IEEE 802.15.4 family of standards, an LTE family of standards, a UMTS family of standards, peer-to-peer (P2P) networks, a 5G standards among others. In an example, the network interface device 320 may include one or more physical jacks (e.g., Ethernet, coaxial, or phone jacks) or one or more antennas to connect to the transmission medium 326.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a GSM radio communication technology, a GPRS radio communication technology, an Enhanced Data Rates for GSM Evolution (EDGE) radio communication technology, and/or a Third Generation Partnership Project (3GPP) radio communication technology, for example UMTS, Freedom of Multimedia Access (FOMA), 3GPP LTE, 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), UMTS (3G), Wideband Code Division Multiple Access (UMTS) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), UMTS-Time-Division Duplex (UMTS-TDD), TD-CDMA, Time Division-Synchronous Code Division Multiple Access, 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), E-UTRA, LTE Advanced (4G), cdmaOne (2G), Code division multiple access 3000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/

ETACS), Digital AMPS (2nd Generation) (D-AMPS (2G)), PTT, Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WIDEN), iBurst, Unlicensed Mobile Access (UMA), also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, Dedicated Short Range Communications (DSRC) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHZ), ITS-G5C (i.e., Operation of ITS applications in the frequency range 5,470 GHz to 5,725 GHZ)), DSRC in Japan in the 700 MHz band (including 715 MHz to 725 MHZ), IEEE 802.11bd based systems, etc.

Aspects described herein may be used in the context of any spectrum management scheme including dedicated licensed spectrum, unlicensed spectrum, license exempt spectrum, (licensed) shared spectrum (such as LSA=Licensed Shared Access in 2.3-2.4 GHz, 2.4-2.6 GHz, 2.6-2.8 GHZ and further frequencies and SAS=Spectrum Access System/CBRS=Citizen Broadband Radio System in 3.55-3.7 GHZ and further frequencies). Applicable spectrum bands include International Mobile Telecommunications spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 320)), 915.9-929.7 MHz (note: allocated for example in Japan), 917-923.5 MHz (note: allocated for example in South Korea), 755-779 MHz and 779-787 MHz (note: allocated for example in China), 790-960 MHZ, 1710-2025 MHz, 2110-2200 MHz, 2300-2400 MHZ, 2.4-2.4835 GHZ (note: it is an ISM band with global availability and it is used by Wi-Fi technology family (11b/g/n/ax) and also by Bluetooth), 2500-2690 MHz, 698-790 MHz, 610-790 MHz, 2400-2600 MHZ, 2400-2800 MHZ, 2800-4200 MHz, 2.55-2.7 GHZ (note: allocated for example in the US for Citizen Broadband Radio Service), 5.15-5.25 GHz and 5.25-5.35 GHz and 5.47-5.725 GHz and 5.725-5.85 GHZ bands (note: allocated for example in the US (FCC part 15), consists four U-NII bands in total 500 MHz spectrum), 5.725-5.875 GHz (note: allocated for example in EU (ETSI EN 201 893)), 5.47-5.65 GHZ (note: allocated for example in South Korea, 5925-7125 MHz and 5925-6425 MHz band (note: under consideration in US and EU, respectively. Next generation Wi-Fi system is expected to include the 6 GHz spectrum as operating band. IMT-advanced spectrum, IMT-2020 spectrum, spectrum made available under FCC's "Spectrum Frontier" 5G initiative, the ITS band of 5.9 GHZ (typically 5.85-5.925 GHZ) and 63-64 GHz, bands currently allocated to WiGig such as WiGig Band 1 (57.24-59.40 GHz), WiGig Band (59.40-61.56 GHZ) and WiGig Band 3 (61.56-63.72 GHz) and WiGig Band 4 (63.72-65.88 GHZ), 57-64/66 GHz. In US (FCC part 15) allocates total 14 GHz spectrum, while EU (ETSI EN 202 567 and ETSI EN 201 217-2 for fixed P2P) allocates total 9 GHz spectrum), the 70.2 GHZ-71 GHz band, any band between 65.88 GHz and 71 GHz, bands currently allocated to automotive radar applications such as 76-81 GHz, and future bands including 94-300 GHz and above. Furthermore, the scheme may be used on a secondary basis on bands such as the TV White Space bands (typically below 790 MHZ) where in particular the 400 MHz and 700 MHz bands are promising candidates. Besides cellular applications, specific applications for vertical markets may be addressed such as Program Making and Special Events (PMSE), medical, health, surgery, automotive, low-latency, drones, etc. applications.

Figure 4:
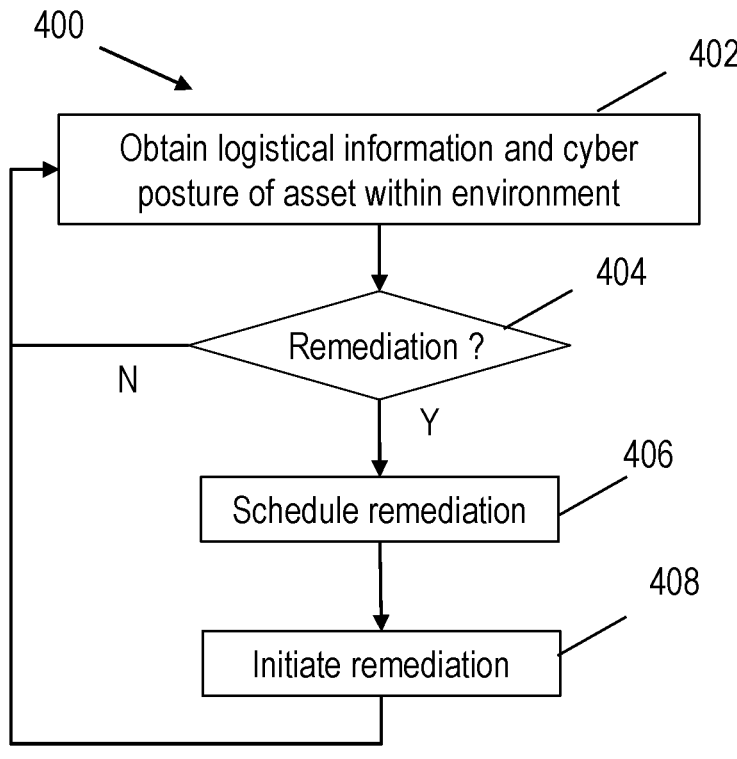
FIG. 4 illustrates a method of remediation according to some embodiments.

FIG. 4 illustrates a method of remediation according to some embodiments. The process 400 of FIG. 4 may be performed by a device local to or remote from an environment. The process 400 is merely exemplary-additional operation may be present and/or some of the processes shown may be present. The process 400 may be performed by one or more processors located within the environment and/or remote from the environment. The process 400 may include obtain logistical information and cyber posture of an asset within environment. The logistical information may be obtained from a local scan (physical, optical, and/or RF) of the asset using a tag on the asset or remotely by accessing property management records in a property management system. The cyber posture may be obtained from the tag and/or using other information such as the IP and/or MAC address of the asset via a cyber system. The logistical information and cyber posture may be obtained automatically periodically (e.g., at the end of a shift, every day) or based on an event (e.g., user initiation locally or remotely, detection of anomalous actions taken by the asset). Operation 402 may be repeated for each asset in the environment or for only a subset of assets in the environment. For example, if the information is obtained automatically, only the information of those assets whose information has not been obtained within a predetermined period may be obtained. Or, if a patch is obtained for a specific type/make/model of asset, only the information of those assets that are identified using the property management system as having those characteristics may be obtained. Examples of assets include robotics, test equipment, generators in a dam or radar installations, and others.

At operation 404, the process 400 determines whether remediation for the asset is to be performed. If not, the process 400 returns to operation 402 and may wait to obtain information of one or more other assets in the environment.

At operation 406, in response to a determination that remediation for the asset(s) is to be performed (e.g., based on a new software patch being available or detection of abnormal actions of the asset), the process 400 may schedule the remediation for one or more of the assets. The scheduling may be based on information not only related to the asset, but also other assets, and the environment. The scheduling of the cyber remediation may be based on information in the property management system to minimize or eliminate issues with potentially taking the asset out of service (e.g., due to recalibration of the asset and/or system after the remediation). Recalibration may be used for example for the measurement side of metrology, in which assets are pulled out of out of use, modified, recalibrated, and then put it back into use, after which the asset is reproved after reinstallation.

At operation 408, the process 400 may initiate remediation of the one or more assets based on the scheduling determined in operation 406. The initiation may include downloading of patches to the asset(s) and/or indications to operators that a patch is to be downloaded, permitting authorized operators to reset the scheduling if desired.

Thus, physical logistics systems may be integrated with cyber systems. This permits information obtained locally for the asset (e.g., operational technology equipment such as factory installations or other fixed assets primarily that are installed and locked in a large industrial setting) via a tag, such as RFID, QR codes, barcode, or contact-based scanning, stored in a property management system to be integrated with cyber systems data that may be obtained using IP and MAC addresses. Accordingly, in some embodiments, when a tag is scanned, the cyber posture of the network-connected asset is reported to the property management system. The information may be displayed and may further include inventory aspects such as what is installed on the asset and asset unusual behavior detected. This allows a single interface to be used that connects cyber vulnerability reports with the actual assets, thereby providing a link between the assets and respective vulnerabilities as well as the information of how and what patches to apply to eliminate the vulnerabilities. This permits insider threat-type information to be determined and a workflow for remediation at the asset to be implemented, allowing the asset owner, among others, the information to remediate the asset from a cyber perspective and optimize network congestion bandwidth. A ticketing system may be used to indicate remediation of one or more assets and/or the system itself.

As deployment of a patch to an operational technology system risks breaking the system, the integration between the property management system and cyber systems leverages the actions associated with recalibration (pull, change, replace and then retest the whole system) as part of the process for patch management for cyber systems. In some embodiments, accordingly when a tag is scanned, the cyber posture of the network-connected asset is reported to the property management system.

In some embodiments, smart-connected packaging technology may be included thereby enabling the physical tag of the item to also be readable over the network.

EXAMPLES

Example 1 is a cyber remediation system comprising: a network interface; and a processor configured to: obtain, from a device within an industrial environment via the network interface, information about each of a plurality of mechanical assets within the industrial environment, each asset of a set of the assets having at least a portion of the information of the asset encoded at a physical tag on the asset; for each asset: identify the asset through a property management database based on the at least a portion of the information and a cyber position of the asset through a digital network identifier in the information in a cyber vulnerability management system synchronized with the property management database, the cyber position indicating software and version installed on the asset and cyber vulnerability of the software installed on the asset; and in response to identification of the asset having a cyber vulnerability, determine remediation for the asset that includes, cyber remediation to mitigate the cyber vulnerability; and initiate the remediation via transmission of information related to the remediation.

In Example 2, the subject matter of Example 1 includes, wherein the information related to the remediation includes a software package to ameliorate the cyber vulnerability of the at least one of the assets.

In Example 3, the subject matter of Examples 1-2 includes, wherein: the remediation is based on the assets, the industrial environment, and network characteristics of a network within the industrial environment, the network characteristics include network congestion over different time periods, and the remediation is initiated based on the network congestion.

In Example 4, the subject matter of Examples 1-3 includes, wherein the processor is configured to initiate the remediation dependent workflows associated with the assets.

In Example 5, the subject matter of Examples 1-4 includes, wherein for each asset, to determine whether the cyber vulnerability of the asset has been exploited, the processor is configured to analyze data associated with the asset to determine anomalous actions of the asset.

In Example 6, the subject matter of Example 5 includes, wherein the actions of the asset include extraneous or unexpected physical actions of the asset.

In Example 7, the subject matter of Examples 5-6 includes, wherein the actions of the asset include inefficiencies in network transmissions of the asset.

In Example 8, the subject matter of Examples 1-7 includes, wherein: the assets include at least one of measurement equipment or robots, and each asset is networked to connect at least one of to an internet or to an internet within the industrial environment.

In Example 9, the subject matter of Examples 1-8 includes, wherein: the physical tag includes an electrically readable portion and a contactless portion, and the information about each asset is obtainable via: physical contact between the device and the electrically readable portion of the physical tag of the asset, and at least one of optical or radio frequency (RF) interaction with the contactless portion of the physical tag of the asset.

In Example 10, the subject matter of Example 9 includes, wherein the remediation comprises manipulation of the electrically readable portion of the physical tag of the asset to adjust the information provided by the electrically readable portion of the physical tag of the asset.

In Example 11, the subject matter of Examples 1-10 includes, wherein the remediation includes scheduling coordination between entities of the cyber vulnerability management system and the industrial environment.

In Example 12, the subject matter of Examples 1-11 includes, wherein the remediation comprises selection between bringing down a system controlling the asset, changing a configuration of the asset, operator training, or updating intrusion detection and alerts.

Example 13 is a method of cyber remediation comprising: coordinating identities and cyber positions of assets within an industrial environment; obtaining, from a device via an internet, information about each of a plurality of mechanical assets within the industrial environment, each asset of a set of the assets having at least a portion of the information of the asset encoded at a physical tag on the asset and being network connected; for each asset: identifying the asset through a property management database based on the at least a portion of the information and a cyber position of the asset through a digital network identifier in the information in a cyber vulnerability management system synchronized with the property management database, the cyber position indicating software and version installed on the asset and cyber vulnerability of the software installed on the asset, the digital identifier including a Media Access Control (MAC) address; and in response to identification of the asset having a cyber vulnerability, determining remediation for the asset that includes, cyber remediation to mitigate the cyber vulnerability; and initiating the remediation via transmission of information related to the remediation, the at least one of the assets including at least one of measurement equipment or a robot.

In Example 14, the subject matter of Example 13 includes, wherein: the remediation is based on the assets, the industrial environment, network characteristics of a network within the industrial environment, the network characteristics include network congestion over different time periods, and the remediation is initiated based on metrology workflows of the assets and the network congestion.

In Example 15, the subject matter of Examples 13-14 includes, for each asset, analyzing data associated with the asset to determine anomalous actions of the asset to determine whether the cyber vulnerability of the asset has been exploited, the actions selected from a group of actions that include extraneous or unexpected physical actions of the asset and inefficiencies in network transmissions of the asset.

In Example 16, the subject matter of Examples 13-15 includes, wherein: the physical tag includes an electrically readable portion and a contactless portion, and the information about each asset is obtainable via: physical contact between the device and the electrically readable portion of the physical tag of the asset, and at least one of optical or radio frequency (RF) interaction with the contactless portion of the physical tag of the asset.

In Example 17, the subject matter of Examples 13-16 includes, wherein: the remediation includes scheduling coordination between entities of the cyber vulnerability management system and the industrial environment, and the remediation comprises selection between bringing down a system controlling the asset, changing a configuration of the asset, operator training, or updating intrusion detection and alerts.

Example 18 is a non-transitory computer-readable storage medium that stores instructions for execution by one or more processors, the one or more processors configured to, when the instructions are executed: coordinate identities and cyber positions of assets within an industrial environment; obtain, from a device via an internet, information about each of a plurality of mechanical assets within the industrial environment, each asset of a set of the assets having at least a portion of the information of the asset encoded at a physical tag on the asset and being network connected: identify the asset through a property management database based on the at least a portion of the information and a cyber position of the asset through a digital network identifier in the information in a cyber vulnerability management system synchronized with the property management database, the cyber position indicating software and version installed on the asset and cyber vulnerability of the software installed on the asset, the digital identifier including a Media Access Control (MAC) address; in response to identification of the asset having a cyber vulnerability, determine remediation for the asset that includes, cyber remediation to mitigate the cyber vulnerability; and initiate the remediation via transmission of information related to the remediation, the at least one of the assets including at least one of measurement equipment or a robot.

In Example 19, the subject matter of Example 18 includes, wherein the one or more processors, when the instructions are executed, for each asset, analyze data associated with the asset to determine anomalous actions of the asset to determine whether the cyber vulnerability of the asset has been exploited, the actions selected from a group of actions that include extraneous or unexpected physical actions of the asset and inefficiencies in network transmissions of the asset.

In Example 20, the subject matter of Examples 18-19 includes, wherein: the physical tag includes an electrically readable portion and a contactless portion, and the information about each asset is obtainable via: physical contact between the device and the electrically readable portion of the physical tag of the asset, and at least one of optical or radio frequency (RF) interaction with the contactless portion of the physical tag of the asset, and the remediation comprises manipulation of the electrically readable portion of the physical tag of the asset to adjust the information provided by the electrically readable portion of the physical tag of the asset, and selection between bringing down a system controlling the asset, changing a configuration of the asset, operator training, or updating intrusion detection and alerts.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to indicate one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. As indicated herein, although the term "a" is used herein, one or more of the associated elements may be used in different embodiments. For example, the term "a processor" configured to carry out specific operations includes both a single processor configured to carry out all of the operations as well as multiple processors individually configured to carry out some or all of the operations (which may overlap) such that the combination of processors carry out all of the operations. Further, the term "includes" may be considered to be interpreted as "includes at least" the elements that follow.

The Abstract of the Disclosure is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A cyber remediation system comprising:
a network interface; and
a processor configured to:
obtain, from a device within an industrial environment via the network interface, information about each of a plurality of mechanical assets within the industrial environment, each asset of a set of the assets having at least a portion of the information of the asset encoded at a physical tag on the asset, the physical tag comprising an electrically readable portion and a contactless portion, the information about each asset being obtainable via physical contact between the device and the electrically readable portion of the physical tag of the asset and at least one of optical or radio frequency (RF) interaction with the contactless portion of the physical tag of the asset; and
for each asset:
identify the asset through a property management database based on the at least a portion of the information and a cyber position of the asset through a digital network identifier in the information in a cyber vulnerability management system synchronized with the property management database, identification of the asset based on both the information encoded at the physical tag and the digital network identifier, the cyber position indicating software and version installed on the asset and cyber vulnerability of the software installed on the asset; and
in response to identification of the asset having a cyber vulnerability, determine remediation for the asset that includes cyber remediation to mitigate the cyber vulnerability;
initiate the remediation via transmission of information related to the remediation, the remediation comprising manipulation of the electrically readable portion of the physical tag of the asset to adjust the information provided by the electrically readable portion of the physical tag of the asset; and
analyze data associated with the asset to determine anomalous physical actions of the asset as an indication of exploitation of the cyber vulnerability.

2. The system of claim 1, wherein the information related to the remediation includes a software package to ameliorate the cyber vulnerability of the at least one of the assets.

3. The system of claim 1, wherein:
the remediation is based on the assets, the industrial environment, and network characteristics of a network within the industrial environment, the network characteristics include network congestion over different time periods, and
the remediation is initiated based on the network congestion.

4. The system of claim 1, wherein the processor is configured to initiate remediation dependent workflows associated with the assets.

5. The system of claim 1, wherein the physical actions of the asset include extraneous or unexpected physical actions of the asset.

6. The system of claim 1, wherein the processor is further configured to analyze the data associated with the asset to determine anomalous network actions of the asset that include inefficiencies in network transmissions of the asset.

7. The system of claim 1, wherein:
the assets include at least one of measurement equipment or robots, and
each asset is networked to connect at least one of to an internet or to an internet within the industrial environment.

8. The system of claim 1, wherein the remediation includes scheduling coordination between entities of the cyber vulnerability management system and the industrial environment.

9. The system of claim 1, wherein the remediation comprises selection between bringing down a system controlling the asset, changing a configuration of the asset, operator training, or updating intrusion detection and alerts.

10. A method of cyber remediation comprising:
coordinating identities and cyber positions of assets within an industrial environment;
obtaining, from a device within an industrial environment via an internet, information about each of a plurality of mechanical assets within the industrial environment, each asset of a set of the assets having at least a portion of the information of the asset encoded at a physical tag on the asset and being network connected, the physical tag comprising an electrically readable portion and a contactless portion, the information about each asset being obtainable via physical contact between the device and the electrically readable portion of the physical tag of the asset and at least one of optical or radio frequency (RF) interaction with the contactless portion of the physical tag of the asset; and for each asset:

identifying the asset through a property management database based on the at least a portion of the information and a cyber position of the asset through a digital network identifier in the information in a cyber vulnerability management system synchronized with the property management database, identification of the asset based on both the information encoded at the physical tag and the digital network identifier, the cyber position indicating software and version installed on the asset and cyber vulnerability of the software installed on the asset, the digital network identifier including a Media Access Control (MAC) address; and in response to identification of the asset having a cyber vulnerability, determining remediation for the asset that includes cyber remediation to mitigate the cyber vulnerability;

initiating the remediation via transmission of information related to the remediation, the remediation comprising manipulation of the electrically readable portion of the physical tag of the asset to adjust the information provided by the electrically readable portion of the physical tag of the asset, and analyzing data associated with the asset to determine anomalous physical actions of the asset as an indication of exploitation of the cyber vulnerability, the at least one of the assets including at least one of measurement equipment or a robot.

11. The method of claim 10, wherein:

the remediation is based on the assets, the industrial environment, network characteristics of a network within the industrial environment, the network characteristics include network congestion over different time periods, and the remediation is initiated based on metrology workflows of the assets and the network congestion.

12. The method of claim 10, further comprising, for each asset, analyzing the data associated with the asset to determine anomalous network actions of the asset to determine whether the cyber vulnerability of the asset has been exploited, the network actions including inefficiencies in network transmissions of the asset.

13. The method of claim 10, wherein:

the remediation includes scheduling coordination between entities of the cyber vulnerability management system and the industrial environment, and the remediation comprises selection between bringing down a system controlling the asset, changing a configuration of the asset, operator training, or updating intrusion detection and alerts.

14. A non-transitory computer-readable storage medium that stores instructions for execution by one or more processors, the one or more processors configured to, when the instructions are executed:

coordinate identities and cyber positions of assets within an industrial environment;

obtain, from a device within an industrial environment via an internet, information about each of a plurality of mechanical assets within the industrial environment, each asset of a set of the assets having at least a portion of the information of the asset encoded at a physical tag on the asset and being network connected the physical tag comprising an electrically readable portion and a contactless portion, the information about each asset being obtainable via physical contact between the device and the electrically readable portion of the physical tag of the asset and at least one of optical or radio frequency (RF) interaction with the contactless portion of the physical tag of the asset; and for each asset:

identify the asset through a property management database based on the at least a portion of the information and a cyber position of the asset through a digital network identifier in the information in a cyber vulnerability management system synchronized with the property management database, identification of the asset based on both the information encoded at the physical tag and the digital network identifier, the cyber position indicating software and version installed on the asset and cyber vulnerability of the software installed on the asset, the digital network identifier including a Media Access Control (MAC) address;

in response to identification of the asset having a cyber vulnerability, determine remediation for the asset that includes cyber remediation to mitigate the cyber vulnerability;

initiate the remediation via transmission of information related to the remediation, the remediation comprising manipulation of the electrically readable portion of the physical tag of the asset to adjust the information provided by the electrically readable portion of the physical tag of the asset, and analyze data associated with the asset to determine anomalous physical actions of the asset as an indication of exploitation of the cyber vulnerability, the at least one of the assets including at least one of measurement equipment or a robot.

15. The non-transitory computer-readable storage medium of claim 14, wherein the one or more processors, when the instructions are executed, for each asset, analyze the data associated with the asset to determine anomalous network actions of the asset to determine whether the cyber vulnerability of the asset has been exploited, the network actions including inefficiencies in network transmissions of the asset.

16. The non-transitory computer-readable storage medium of claim 14, wherein:

the remediation comprises at least one of bringing down a system controlling the asset, changing a configuration of the asset, operator training, or updating intrusion detection and alerts.

* * * * *